US006688197B1

United States Patent
Niemela (10) Patent No.: US 6,688,197 B1
(45) Date of Patent: Feb. 10, 2004

(54) NOTCH SAWING APPARATUS FOR DOVE-TAIL JOINTS

(76) Inventor: Leo L. Niemela, 422 N. Superior Ave. P.O. Box 910, Baraga, MI (US) 49908

( * ) Notice: Subject to any disclaimer, the term of this patent is extended or adjusted under 35 U.S.C. 154(b) by 17 days.

(21) Appl. No.: 09/961,609

(22) Filed: Sep. 24, 2001

(51) Int. Cl.[7] .................................................. B26D 1/03
(52) U.S. Cl. .............................. 83/39; 83/875; 83/887; 144/347; 144/28.72; 144/28.6
(58) Field of Search ........................... 83/39, 875, 887; 144/28.72, 28.6, 347

(56) References Cited

U.S. PATENT DOCUMENTS

| | | | |
|---|---|---|---|
| 1,844,057 A | | 2/1932 | Buchan et al. |
| 3,078,888 A | | 2/1963 | Bruemmer |
| 3,080,895 A | * | 3/1963 | Mayo ........................ 83/404.1 |
| 3,416,643 A | * | 12/1968 | Kotila ....................... 198/463.4 |
| 3,487,747 A | | 1/1970 | Burrows et al. |
| 3,538,963 A | * | 11/1970 | Adams ........................ 83/415 |
| 3,540,498 A | | 11/1970 | Woloveke et al. |
| 3,888,150 A | * | 6/1975 | Stroud et al. ................ 83/368 |
| 4,031,933 A | * | 6/1977 | Piche ........................ 144/198.1 |
| 4,078,460 A | * | 3/1978 | Bowman ....................... 83/877 |
| 4,176,696 A | | 12/1979 | Greeninger |
| 4,206,673 A | | 6/1980 | Detjen |
| 4,221,246 A | | 9/1980 | Grutter |
| 4,243,082 A | | 1/1981 | Paris, Jr. et al. |
| 4,277,998 A | * | 7/1981 | Mayo ........................ 83/404.1 |
| 4,316,400 A | * | 2/1982 | Mayo ........................ 83/425.2 |
| 4,392,520 A | | 7/1983 | Wrightman |
| 4,408,510 A | | 10/1983 | Reuter |
| 4,640,161 A | * | 2/1987 | Kurk ........................... 83/104 |
| 4,938,263 A | | 7/1990 | Wrightman |
| 4,999,915 A | * | 3/1991 | Jackson et al. ............... 30/369 |
| 5,018,562 A | * | 5/1991 | Adams ..................... 144/253.1 |
| 5,368,424 A | | 11/1994 | Bettenhausen |
| 5,383,275 A | | 1/1995 | Hild et al. |
| 5,435,217 A | | 7/1995 | Kato et al. |
| 5,479,709 A | | 1/1996 | Lai |
| 5,809,857 A | * | 9/1998 | Owen ........................ 83/404.1 |
| 6,076,443 A | | 6/2000 | Theising et al. |

* cited by examiner

Primary Examiner—Allan N. Shoap
Assistant Examiner—Phong Nguyen
(74) Attorney, Agent, or Firm—Van Dyke, Gardner, Linn & Burkhart, LLP (57) ABSTRACT

A sawing apparatus for cutting dove-tail notches in boards includes at least one saw for cutting one or more back cuts of the dove-tail notch and at least one saw for cutting one or more head cuts of the dove-tail notch. The head saw is configured to be able to cut head cuts that are angled both with respect to a horizontal plane and a vertical plane that is generally parallel to one of the sides of the board. This type of head cut creates a Scandinavian or Finnish dove-tail notch. The sawing apparatus may be mounted on a towable trailer, may include a generator for powering the saws, and may utilize band saws for cutting the dove-tail notches.

15 Claims, 12 Drawing Sheets

NOTCH SAWING APPARATUS FOR DOVE-TAIL JOINTS

BACKGROUND OF THE INVENTION

This invention relates generally to machines for cutting wood, and in particular to machines for cutting dove-tail notches in pieces of lumber.

One type of dove-tail notch that has been used in the past for the construction of log cabins and other log buildings is the Finnish or Scandinavian dove-tail notch. This type of notch has a compound angle that provides at least two advantages over conventional dove-tail notches. First, the compound angle helps drain rain water out of the dove-tail joint because the surfaces of the dove-tail cut all have an angular component that faces outwardly and away from the joint. As the rain water flows downwardly, this angular component helps drain the water to the outside of the joint. Second, the compound angle of the Finnish or Scandinavian dove-tail notch helps make the dove-tail joint tighter as the lumber shrinks. For at least these two reasons, this type of dove-tail notch provides a desirable manner for securing lumber together, particularly lumber being used in a manner that exposes it to rain or other sources of water.

Scandinavian or Finnish dove-tail notches, however, are difficult to cut because of their compound angle. Cutting the compound angle has often been a labor-intensive project in the past that has led to a decline in the use of these types of joints. It would therefore be desirable to provide a manner of cutting these types of joints that reduced the labor and expense of the previous methods.

SUMMARY OF THE INVENTION

Accordingly, the present invention provides an apparatus for cutting dove-tail notches, such as Scandinavian or Finnish notches, that is simple to use and that allows these notches to be cut with a minimal amount of labor.

According to one embodiment of the invention, a lumber cutting assembly is provided that includes a longitudinally extending, generally horizontal support for supporting a piece of lumber to be cut. The cutting assembly further includes a first, second, and third saw. The first saw is positioned on a first side of the support while the second saw is positioned on an opposite side of the support. The first and second saw are movable toward and away from the support. The third saw is positioned adjacent a front end of the support and is movable longitudinally toward and away from the support.

According to another embodiment of the invention, an apparatus for cutting dove-tail notches in a piece of lumber is provided. The apparatus includes a trailer adapted to be towed by a truck or car and a lumber support positioned on the trailer. The apparatus further includes at least one saw for cutting at least one back cut in the lumber, as well as at least one saw for cutting at least one head cut in the lumber. The back cut is cut generally perpendicular to a top surface of the lumber and shortens the length of one of the sides of the lumber. The head cut defines a plane that is not perpendicular to the plane defined by the back cut and that is not perpendicular to the plane defined by the top surface of the piece of lumber.

According to another embodiment of the invention, an apparatus for cutting dove-tail notches is provided. The apparatus includes at least one band saw for cutting at least one back cut in the lumber, and at least one band saw for cutting at least one head cut in the lumber. The back cut shortens the length of one of the sides of the piece of lumber and is cut generally perpendicular to the top surface of the lumber. The head cut defines a plane that is not perpendicular to the plane defined by the back cut and that is not perpendicular to the plane defined by the top surface of the lumber.

According to still another aspect of the present invention, a method is provided for cutting a piece of lumber having a top surface and two side surfaces. The lumber is placed on a stationary support and a back cut is cut into each of the side surfaces. Two head cuts are also made in the lumber with each head cut defining a plane that is not perpendicular to the plane defined by the top surface nor the plane defined by one of the back cuts. The back cuts and the head cuts are made without ever rotating the lumber.

According to still other aspects of the present invention, the saw or saws for cutting the back cuts may be mounted on a movable platform that allows the saws to move toward and away from the lumber. The head saw may be pivotable between opposite sides of the lumber, and may further be mounted on a cart that allows the head saw to move toward and away from one end of the piece of lumber. The head saw may further be pivotable about a single horizontal axis, or about two horizontal axes that are perpendicular to each other. In still other aspects of the present invention, the saws may be powered by an electrical generator mounted on the trailer to facilitate the use of the apparatus in virtually any location and environment.

The dove-tail notch cutting machine of the present invention not only provides a simple and quick way of cutting dove-tail notches, but further facilitates the cutting of such notches by being portable. The apparatus can therefore be easily transported to a building site or other location where dove-tail notches are needed. The cutting machine of the present invention also generates dove-tail notches that are accurately cut and that can be easily replicated from one piece of lumber to the next. These and other benefits of the present invention will become apparent to one skilled in the art from the following specification when read in conjunction with the accompanying drawings.

DESCRIPTION OF THE PREFERRED EMBODIMENTS

Figure 1:
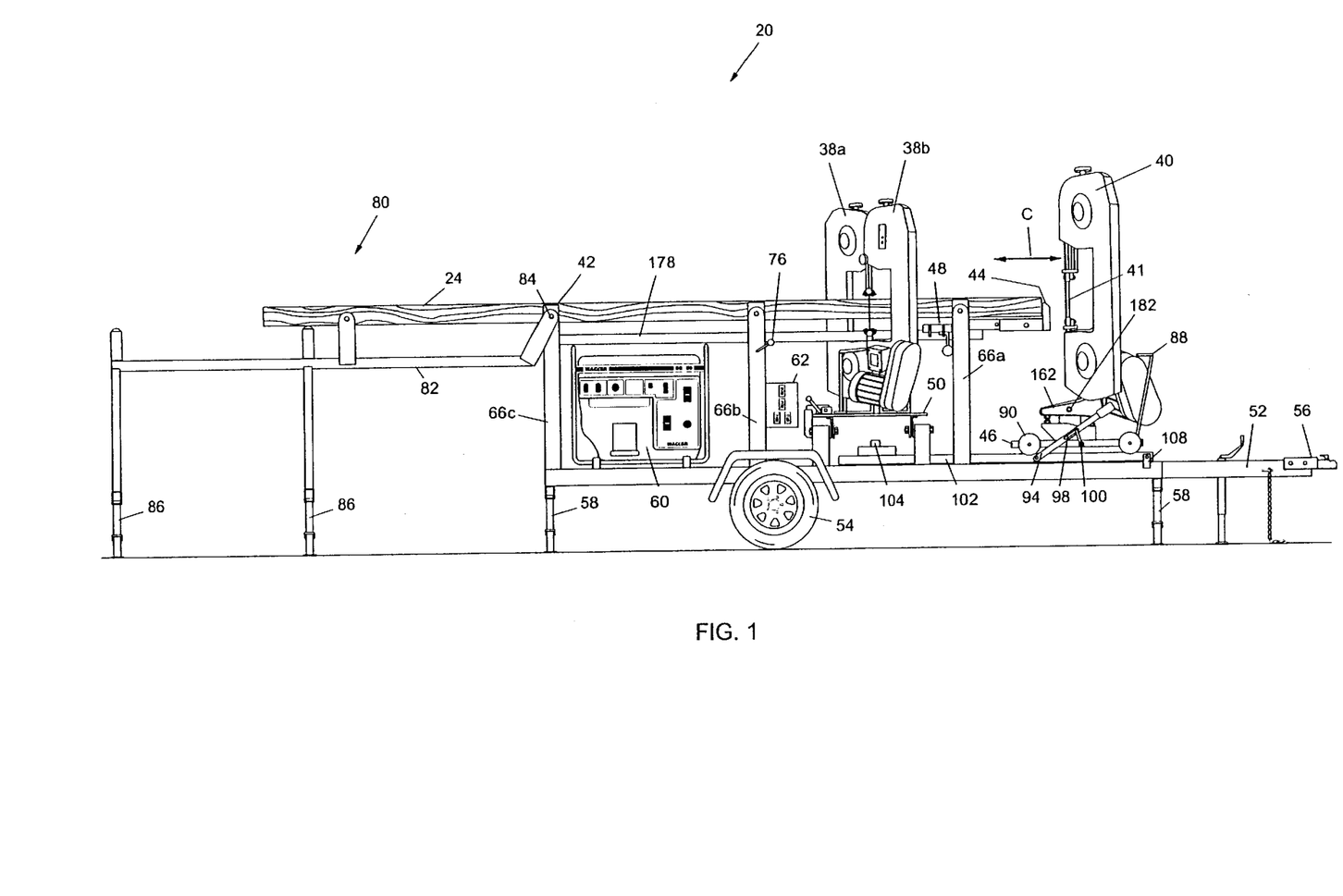
FIG. 1 is a side, elevational view of a cutting apparatus according to one embodiment of the present invention.
Figure 2:
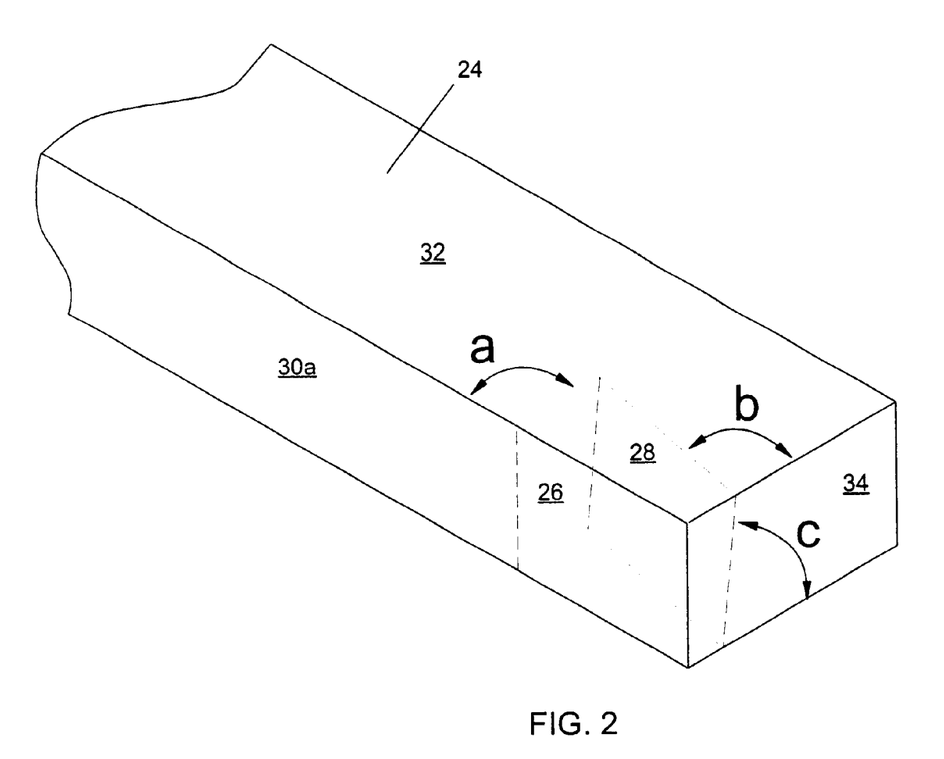
FIG. 2 is a perspective view of half of a dove-tail notch that can be cut with the apparatus of the present invention.

The present invention will now be described with reference to the accompanying drawings wherein like reference numerals in the following written description correspond to like elements in the several drawings. A dove-tail notch cutting apparatus 20 according to one embodiment of the present invention is depicted in FIG. 1. Cutting apparatus 20 is adapted to cut conventional dove-tail notches, as well as Scandinavian or Finnish dove-tail notches, as will be described more fully herein. A half of a Scandinavian or Finnish dove-tail notch 22 cut in a piece of lumber 24 is depicted in phantom in FIG. 2. Notch 22 includes a back cut surface 26 and a head cut surface 28. Back cut surface 26 is cut at an angle "a" that is preferably, although not necessarily, 90° with respect to a side surface 30a of board 24. Back cut surface 26 is also oriented at an angle of 90° with respect to a top surface 32 of board 24. Head cut surface 28 is cut at an angle "b" with respect to an end surface 34 of board 24 that is preferably an acute angle. Head cut surface 28 is also cut at an angle "c" with respect to a bottom surface 36 of board 24. For forming a Scandinavian or Finnish dove-tail notch (hereinafter referred to as a compound notch), head cut surface 28 should be made such that angle "c" is an acute angle. If a conventional dove-tail notch is desired, surface 28 should be cut such that angle "c" is equal to 90°. As noted, apparatus 20 can cut either compound or conventional notches 22. Further, as will be described in more detail below, apparatus 20 can cut notches with angles "b" and "c" varied as desired.

The cuts made in board 24 to define the back cut surfaces 26 are made by a pair of back saws 38a and b (FIG. 1). Back saws 38a and b are disposed across from each other on opposite sides of board 24. The cuts made in board 24 to define the head cut surfaces 28 are made by a head saw 40 positioned adjacent front end surface 34 of board 24. Head saw 40 makes both of the head cuts 28 in a full dove-tail notch 22, while back saws 38a and b each make one of the two back cuts 26 in the full dove-tail notch 22.

In operation, a board 24 to be cut is first placed on a support 42 in a generally horizontal orientation. Thereafter, either the back cuts 26 or the head cuts 28 can next be made.

Figure 6:
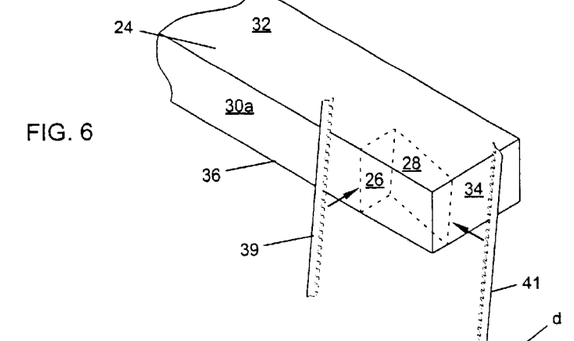
FIG. 6 is a partial, perspective view of the blades used to cut a first half of a dove-tail notch.
Figure 7:
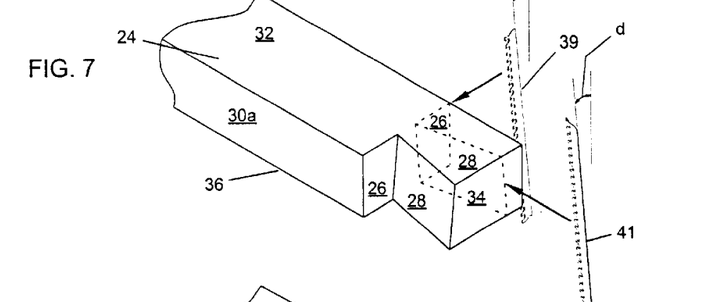
FIG. 7 is a partial, perspective view of the blades used to cut a second half of a dove-tail notch.
Figure 8:
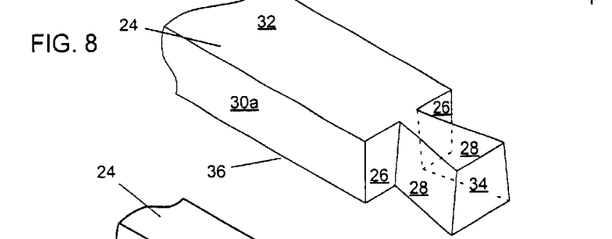
FIG. 8 is a partial, perspective view of a Finnish or Scandinavian dove-tail notch.
Figure 9:
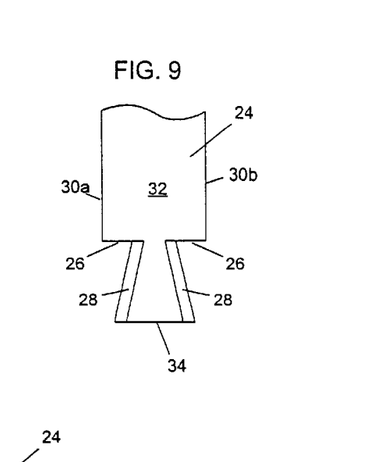
FIG. 9 is a plan view of the dove-tail notch of FIG. 8.

If the head cuts 28 are desired to be made first, the front end 34 of board 24 is pushed up against a front stop 44. Head saw 40 is adjusted to create the desired angles "b" and "c" in notch 22, in a manner more fully described below. Head saw 40 is then moved toward board 24 via a cart 46 until a blade 41 of head saw 40 engages board 24 and head cut 28 is made on one of sides 30a and b (FIGS. 6–7). Thereafter, head saw 40 is pivoted in a manner to be described in order to make the head cut 28 in the other of sides 30a and b. Prior to making this second head cut 28, head saw 40 is adjusted to make the second head cut 28 have angles equal to the 180 degree complements of angles "b" and "c" (i.e. 180° minus "b" and 180° minus "c," respectively). The two head cuts 28 on either side of board 24 will therefore be symmetrical.

Figure 10:
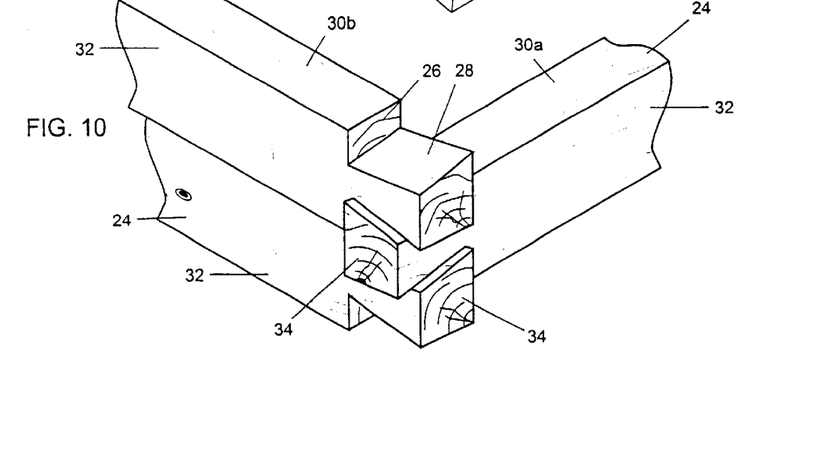
FIG. 10 is a perspective view of three pieces of lumber secured together by dovetail notches cut by the apparatus of the present invention.

After both head cuts 28 have been made, the back cut surfaces 26 can be made by way of back saws 38a and b. This is accomplished by first moving front end 34 of board 24 rearwardly toward back saws 38 until front end 34 abuts against a rear stop 48. Each back saw 38 is adjusted so that its blade will match angle "c," i.e., extend parallel to surface 28, on each of the respective sides of board 24. A first back cut 26 is made by pushing back saw 38a toward board 24 until a saw blade 39 has cut sufficiently into the first side 30a of board 24. The second back cut 26 is made by pushing the other back saw 38b toward an opposite side of board 24 until the saw blade has cut sufficiently into the second side 30b of board 24. The order of cutting into sides 30a and 30b can, of course, be reversed. Back saws 38a and b are movable toward and away from board 24 by way of a movable platform 50. Platform 50 is movable in a direction generally perpendicular to the longitudinal extent of board 24. After back cuts 26 and head cuts 28 have been made, dove-tail notch 22 is completed. Board 24 can then be flipped around to make another dove-tail notch 22 in its opposite end, or a new board 24 can be placed onto support 42 to have a dove-tail notch cut there-into. After a series of boards 24 have been cut with dove-tail notches 22 in them, they can be stacked together in a manner illustrated in FIG. 10.

It should be noted when viewing the attached drawings that blade 41 of head saw 40 is generally planar, and that the plane in which blade 41 resides is not parallel to the generally planar body of head saw 40. Likewise, the generally planar blades 39 of back saws 38 are each non-parallel with respect to the plane of the generally planar saw body. This orientation of blades 39 and 41 is not part of the invention, but merely reflects the particular band saws used in the illustrated embodiment. Any type of band saws may be used for saws 38 and 40 within the scope of the present invention, and appropriate adjustments can be made in the orientation of saws 38 and 40 to ensure that the blades cut at the proper angle. Circular blades, such as on circular saws, could also be used within the scope of the invention provided that modifications were made to apparatus 20 to allow these blades and saws to move in a manner that created a cut of uniform depth.

Dove-tail notch cutting apparatus 20 is mobile and can be transported to virtually any work location by way of a trailer 52. Trailer 52 may be a conventional trailer that includes a pair of wheels 54 and a hitch 56 adapted to be pulled by a car or truck. Trailer 52 may further include any necessary safety features that are required for it to be towed on the road, such as brake lights, turn signal indicators, etc. Trailer 52 further includes a plurality of stabilizers 58, which may be conventional stabilizers, that allow trailer 52 to be secured in a generally horizontal orientation when not being towed. An electrical generator 60 may further be included on trailer 52 as part of notch cutting apparatus 20. Electrical generator 60 may be any conventional electric generator, such as a gasoline-burning generator or other type, that provides sufficient electrical energy to operate saws 38 and 40. Electrical generator 60 may be electrically coupled to, and supply power to, a series of electrical outlets 62 into which the electrical cords (not shown) of saws 38 and 40 may be plugged. Additional electrical equipment, such as a fan, a light, a sawdust vacuum, or other devices, may be powered from electrical outlets 62.

Figure 13:
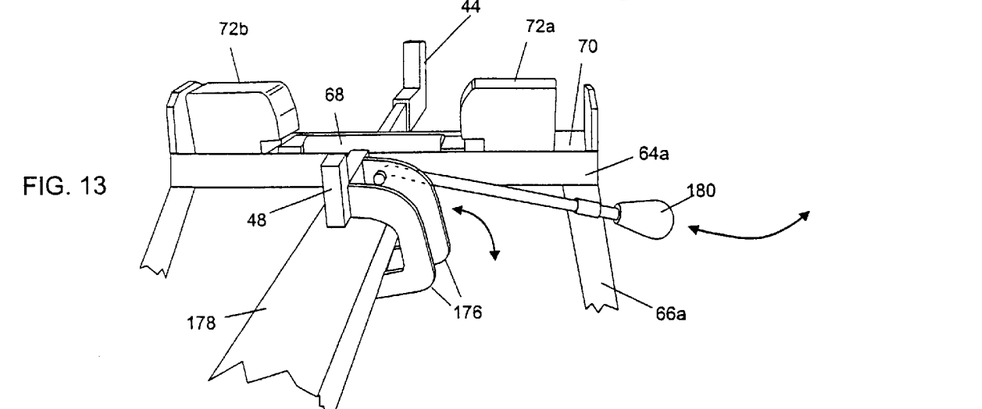
FIG. 13 is an end, perspective view of the lumber stops of FIG. 12.
Figure 14:
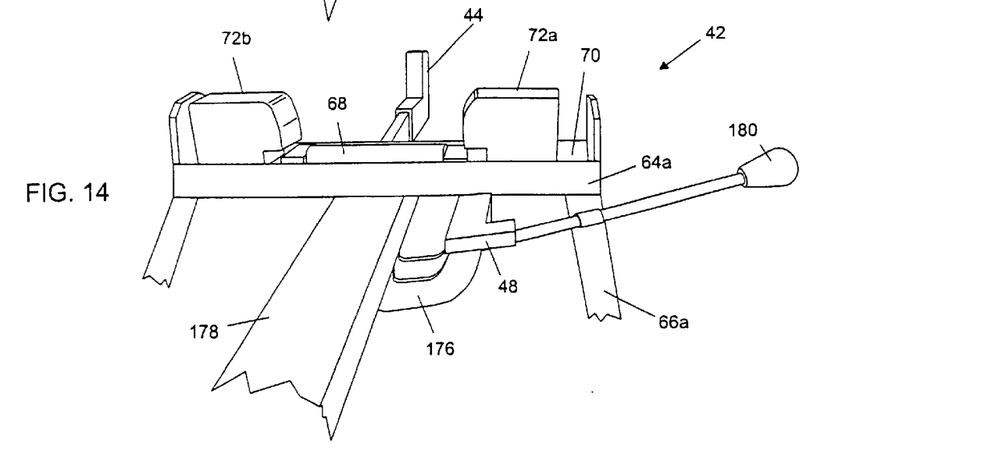
FIG. 14 is an end, perspective view of the lumber stops of FIG. 12 shown with one pivoted to a non-stopping position.
Figure 15:
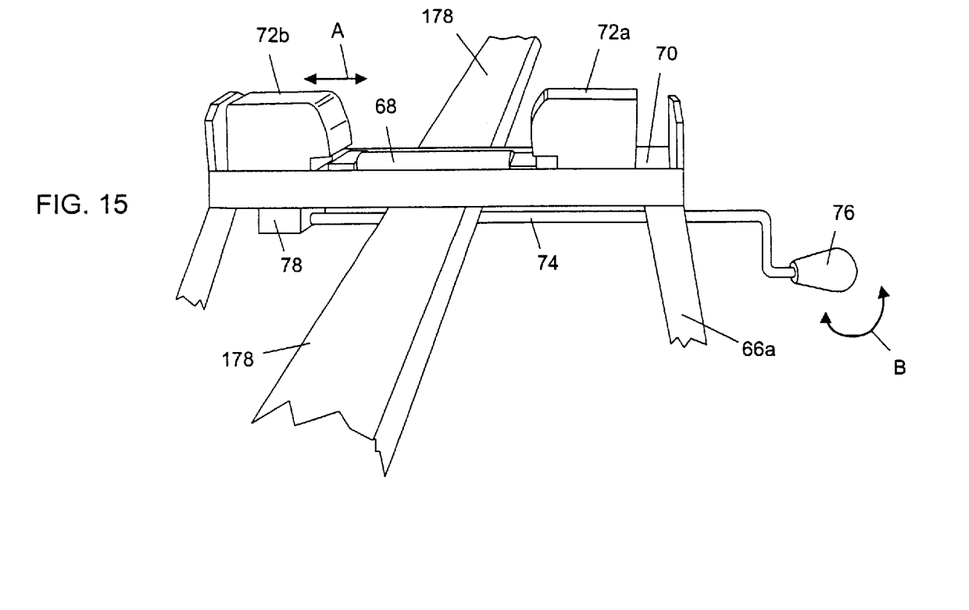
FIG. 15 is a perspective view of a cross-bar with an adjustable gage block.

Support 42 includes a plurality of horizontal cross-bars 64 that extend generally from one side of to the other side of trailer 52 (FIGS. 13–15). Cross-bars 64 are oriented generally perpendicular to the longitudinal extent of board 24 when board 24 is placed on cross-bars 64. Cross-bars 64 are each supported by a pair of side frame members 66 that extend upwardly from the bottom of trailer 52. Each cross-bar 64 preferably includes a roller 68 positioned slightly above a top surface 70 such that board 24 will contact the roller surface when placed on cross-bars 64. Rollers 68 allow board 24 to be rolled in a longitudinal direction, which facilitates the movement of board 24 that is necessary to move it into proper position for being cut. Rollers 68 are centered along cross-bars 64 in the illustrated embodiment and have a shorter width than that of cross-bars 64.

A pair of gage blocks 72a and b are positioned on top of each cross-bar 64 on either side of roller 68. Gage blocks 72a and b help keep board 24 from moving while being cut. At least one set of gage blocks 72a and b includes an adjustable gage block in order to clamp board 24 therebetween. In the illustrated embodiment, gage block 72b on cross-bar 64b is adjustable in the direction indicated by arrow A (FIG. 15), which is a direction generally transverse to the longitudinal extent of board 24. The movement of gage block 72b is controlled by a rotatable shaft 74 having a handle 76. Rotatable shaft 74 is rotatable about its longitudinal axis in a direction generally indicated by arrow B. Rotatable shaft 74 includes a plurality of external threads at its end opposite handle 76. These external threads engage internal threads defined in an adjustment block 78 attached to a bottom side of gage block 72b. The rotation of shaft 74 causes adjustment block 78 to move generally axially along shaft 74, either toward or away from handle 76, depending on which direction shaft 74 is rotated. This movement of adjustment block 78 is caused by engagement of the external threads on shaft 74 with the internal threads of adjustment block 78. Because adjustment block 78 is attached to gage block 72b, gage block 72b will move with adjustment block 78. As gage block 72a is fixed in a stationary position, the movement of gage block 72b toward gage block 72a will create a clamping action against a board 24 positioned between these two gage blocks 72. While gage block 72b on cross-bar 64b is the only gage block depicted as movable in the illustrated embodiment, it will be understood that movable gage block 72 can be mounted to other cross-bars 64 as well.

In addition to support 42, cutting apparatus 20 may also include an extendable support 80. Extendable support 80 includes an additional cross-bar 64d that is supported on a pivotable frame 82. Pivotable frame 82 pivots about a pivot axis 84 that extends through cross-bar 64c. This pivoting allows frame 82 to be swung on top of trailer 52 when not being used for cutting, and to be swung out to the extended position (FIG. 1) when used for cutting. Pivotable frame 82 includes a plurality of conventional height adjusters 86 that can be adjusted as appropriate to support cross-bar 64d at the same height as cross-bars 64a–c. Extendable support 80 thereby provides additional support for boards 24 that extends for a significantly longer distance than the distance between cross-bars 64a and 64c.

Figure 4:
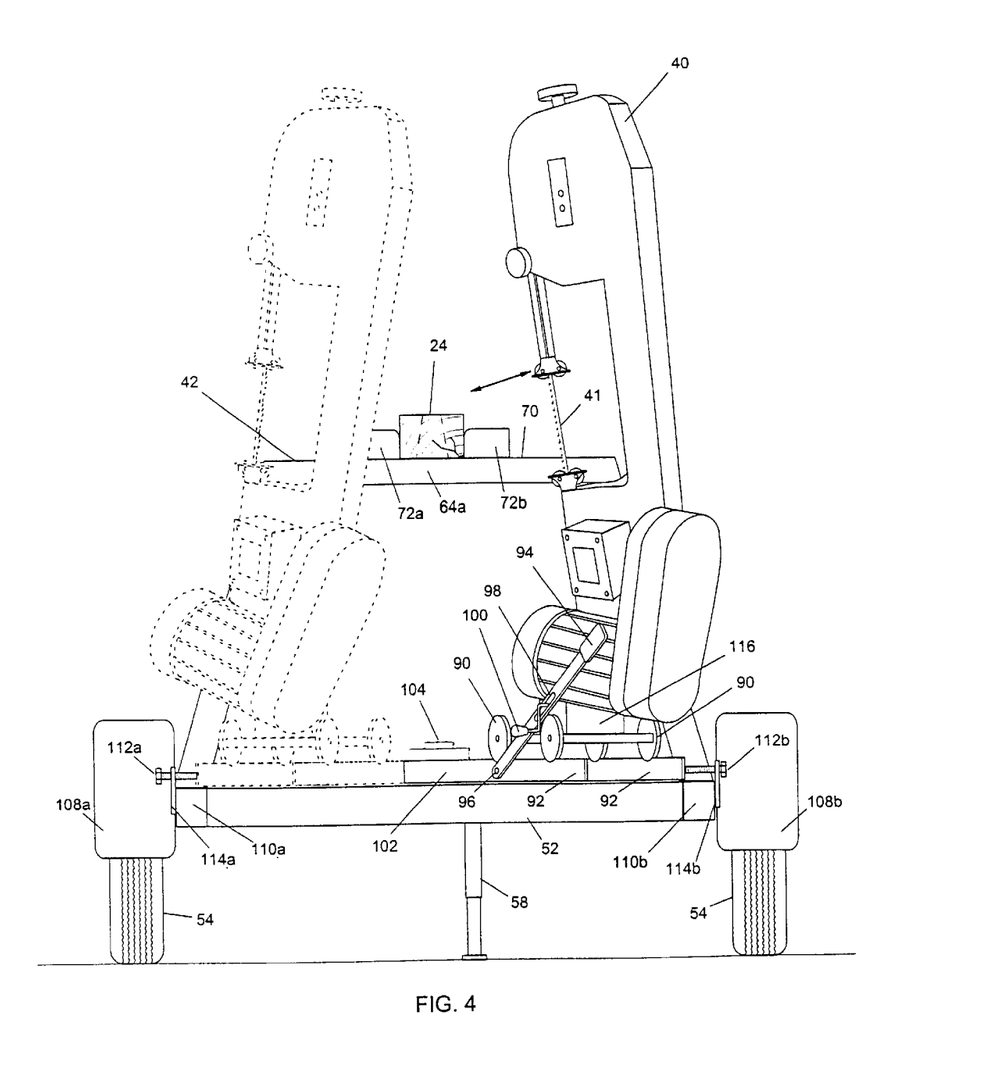
FIG. 4 is a front, partial, elevational view of the head saw on the apparatus of FIG. 1, shown with various components removed for clarity.
Figure 5:
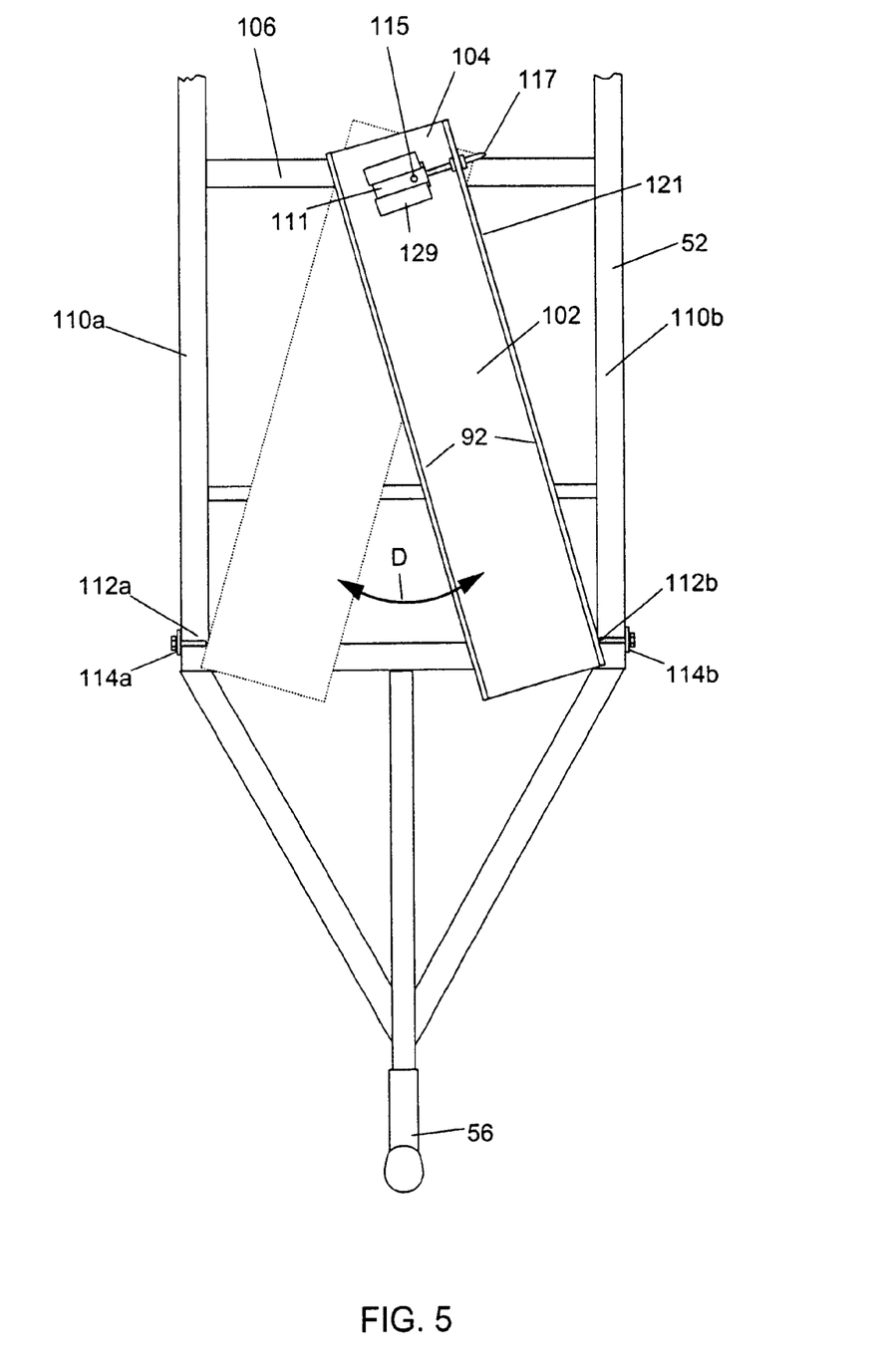
FIG. 5 is a partial, plan view of a pivotable platform and trailer of the apparatus of FIG. 1, shown with various components removed for clarity.

When a dove-tail notch is to be cut into board 24, either the back cuts 26 or the head cuts 28 can be made first. If the head cuts 28 are to be made first, board 24 is moved along support 42 until its front end contacts front stop 44. Once properly positioned, board 24 remains fixed while head saw 40 is rolled toward the front end of board 24 via cart 46 in the direction indicated by arrow C in FIG. 1. As cart 46 is rolled toward board 24, one head cut 28 is made. The rolling movement of head saw 40 toward or away from board 24 is facilitated by the use of a handle 88 attached to a front end of cart 46. Cart 46 includes a plurality of wheels 90 that ride on a pair of parallel guide tracks 92 (FIGS. 4–5). The rolling movement of cart 46 on guide tracks 92 is limited by a limit bar 94. Limit bar 94 is pivotally attached at a pivot axis 96 to a side of one of guide tracks 92. Limit bar 94 angles upwardly and forwardly from pivot axis 96 and includes a longitudinal slot 98 defined generally in the middle of limit bar 94. A rotatable handle 100 has a shaft that passes through slot 98 in limit bar 94 and is attached to a pivotable support for head saw 40. Rotatable handle 100 is used to adjust the angle of head saw 40 that corresponds to angle "c" in the dove-tail notch, as will be described in more detail below. As cart 46 is pushed toward board 24, handle 100 will move in slot 98 toward the lower end of slot 98. Eventually, handle 100 will contact the lower end of slot 98 and this will prevent cart 46 from being pushed any further toward board 24. As cart 46 is pulled away from board 24, handle 100 will move in slot 98 toward the upper end of slot 98. When it contacts the upper end of slot 98, it will prevent cart 46 from being pulled further away from board 24.

The length of slot 98 therefore will determine the amount of forward and rearward movement of cart 46. In order to ease the cutting of multiple dove-tail notches, the length of slot 98 is preferably set such that it will stop head saw 40 when it has cut head cut 28 to the desired depth. Head cuts 28 can thereby be made by an operator simply pushing cart 46 to its limit toward board 24 without having to watch the depth of cut being made. In this case, the precise length of slot 98 will be determined by the position of head saw 40 relative to front stop 44 and the angle of limit bar 94. Alternatively, slot 98 can have a greater length that serves only to prevent cart 46 from rolling off of guide tracks 92 and which requires an operator to manually stop cart 46 at the desired depth of head cut 28.

Guide tracks 92 are defined on a pivotable platform 102 that pivots about a vertical pivot axis 104 in a direction indicated by arrows D in FIG. 5. Platform 102 is pivotally attached to a transverse base bar 106 on trailer 52. The pivoting of platform 102 is limited by a pair of pivot stops 108a and b attached to side members 10a and b of trailer 52. Pivot stops 108 each include a threaded adjustment bolt 112 that is inserted through a threaded aperture in a plate 114 attached to one of side members 110. By rotating threaded bolts 112 in plates 114, bolts 112 will move either inwardly or outwardly, depending upon the direction of rotation, in a direction generally transverse to the longitudinal extent of trailer 52. Platform 102 will contact either of adjustment bolts 112 when it is pivoted to its extreme positions and be stopped thereby. By rotating bolts 112 so that they extend inwardly from plates 112 a desired amount, the maximum pivoting of platform 102 can be adjusted as desired. Additionally, to adjust the pivoting of platform 102 to a greater degree, different adjustment bolts 112 that have a greater length than those depicted in the accompanying drawings can be used.

The pivoting of platform 102 causes head saw 40 to also pivot because head saw 40 is mounted on cart 46 which rides on tracks 92 of pivotable platform 102. The pivoting of platform 102 will vary the angle "b" that is cut in dove-tail notch 22. Preferably, although not necessarily, adjustment bolts 112 will be set such that platform 102 will be oriented at angle "b" when it is pushed up against one of adjustment bolts 112. To make the first head cut 28 of a full dove-tail notch 22, platform 102 is pivoted up against one of adjustment bolts 102. Cart 46 is then pushed toward board 24 until a first head cut 28 is made. Thereafter, cart 46 is pulled away from board 24 and platform 102 is pivoted until it comes into contact with the other adjustment bolt 112. After head saw 40 is adjusted to create the desired angle "c" in a manner to be described below, cart 46 is again pushed toward board 24 until the second head cut 28 is made.

Figure 19:
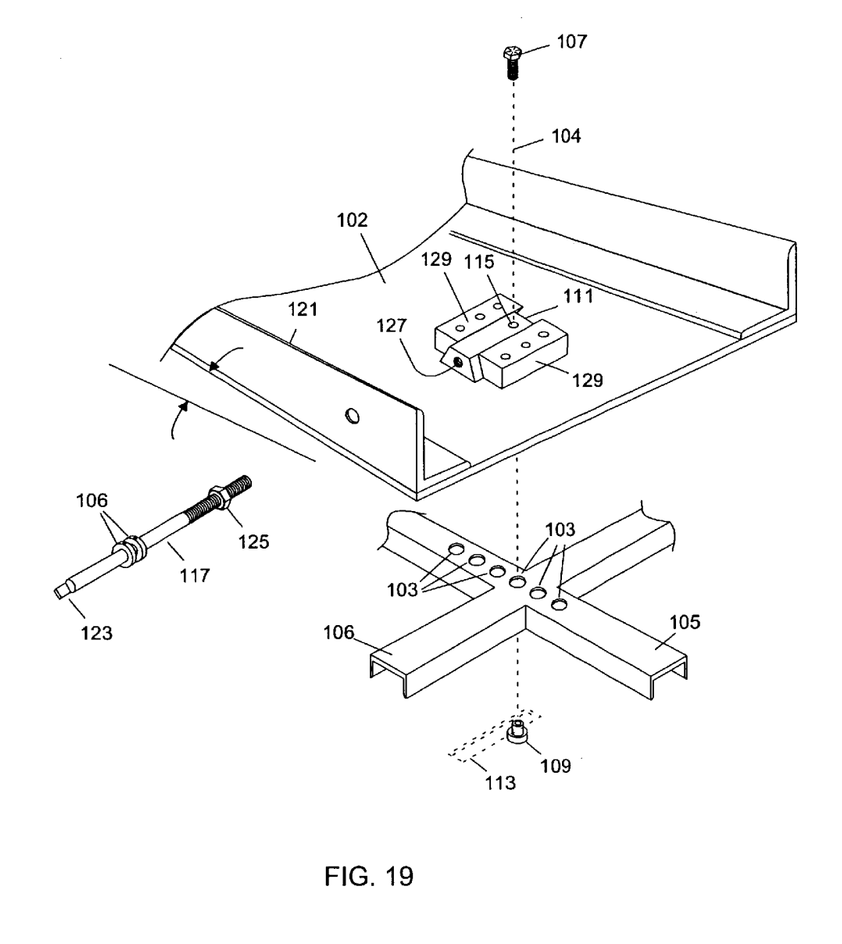
FIG. 19 is a partial, perspective, exploded view of the pivotable platform illustrating its attachment to the trailer frame.
Figure 20:
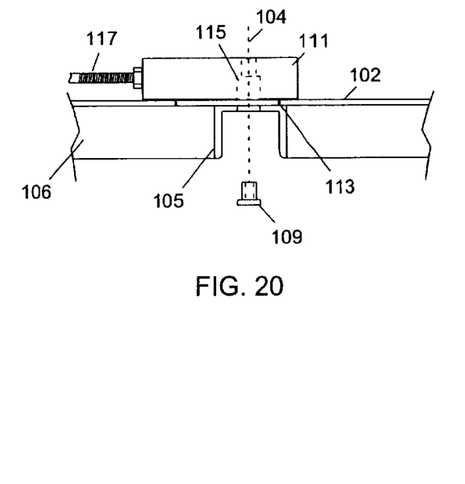
FIG. 20 is a partial, front, elevational view of the pivotable platform and trailer frame of FIG. 19 illustrated with a retainer block removed for clarity.

The pivot axis 104 of pivotable platform 102 is adjustable on trailer 52 both longitudinally and in a side-to-side manner. The longitudinal adjustment of pivot axis 104 is accomplished by a series of longitudinally spaced holes 103 defined in a longitudinal base bar 105 of trailer 52 (FIG. 19). Depending upon which longitudinal position of pivot axis 104 is desired, a bolt 107 and pivot nut 109 are inserted through the selected hole 103. Pivot nut 109 defines the vertical axis 104 about which platform 102 pivots. Pivot nut 109 also fits through a rectangular slot 113 defined in pivotable platform 102 that provides clearance for pivot nut 109 when pivotable platform 102 moves in a side-to-side fashion. Bolt 107 and pivot nut 109 are inserted through a vertical hole 115 in a mandrel 111 (FIGS. 19 & 20). Mandrel 111, in combination with a rotatable shaft 117, allows pivotable platform 102 to move in a side-to-side manner. Mandrel 111 is slidingly attached to pivotable platform 102 via a pair of retainer blocks 129. Rotatable shaft 117 includes a pair of collars 119 that fit around a side edge 121 of pivotable platform 102. Rotatable shaft 117 further includes a square end 123 and a stop nut 125. Rotatable shaft 117, which includes external threads at its end opposite square end 123, is inserted into an internally threaded hole 127 in mandrel 111. By using a wrench or other means on square end 123, shaft 117 can be rotated. The rotation of shaft 117 causes mandrel 111 to be moved relative to side edge 121 of pivotable platform 102. The direction of movement will depend on the direction of rotation of shaft 117. Rotating shaft 117 therefore allows the pivot axis 104 of pivotable platform 102 to be adjusted in a side-to-side manner on trailer 52. Stop nut 125 limits the amount of adjustment of side-to-side adjustment of platform 102, as well as allowing platform 102 to be locked in a particular side-to-side position after shaft 117 has been rotated as desired. This locking action is accomplished by rotating nut 125 until it contacts tightly against the side of mandrel 111, thereby preventing any movement of mandrel 111 in at least one direction.

Figure 11:
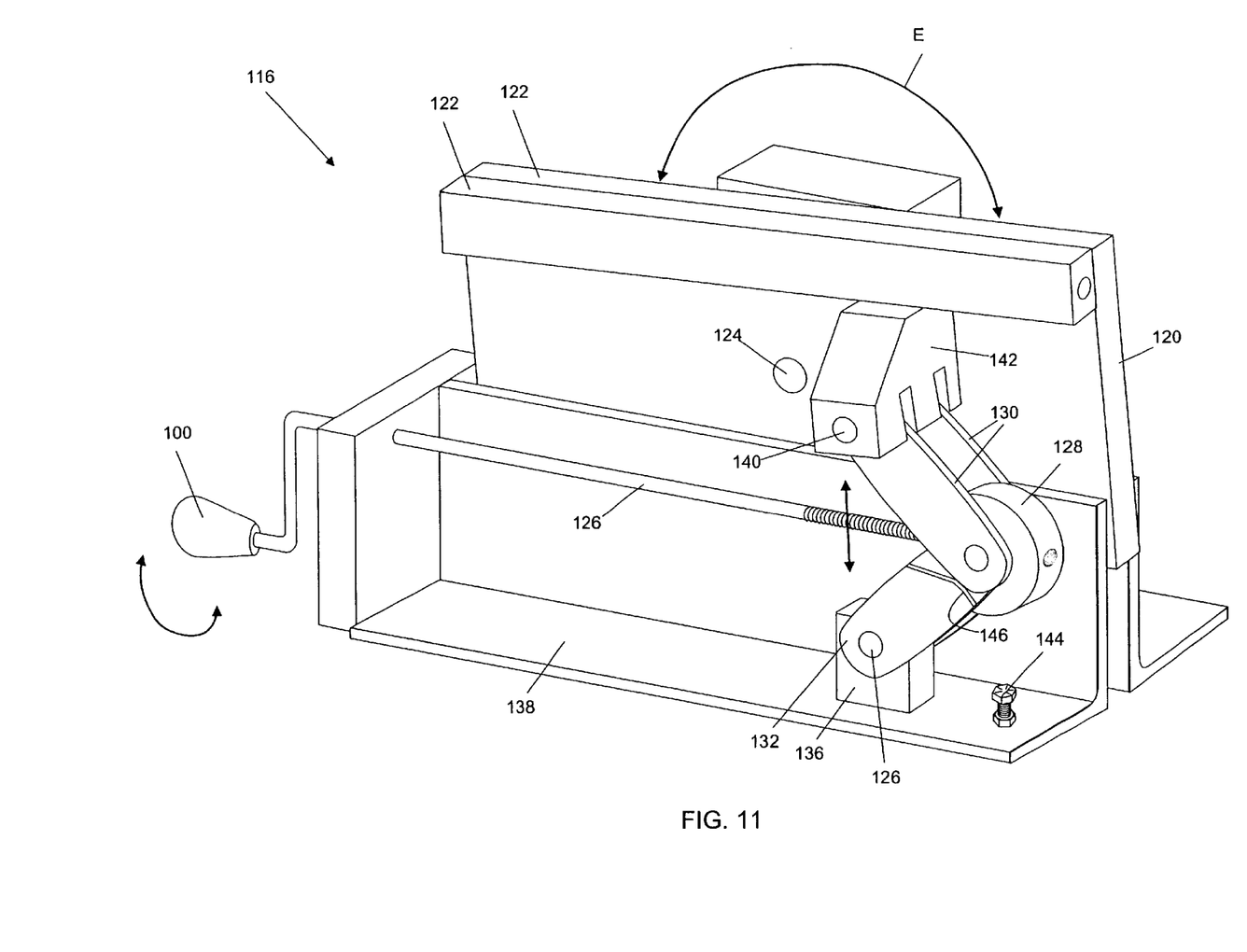
FIG. 11 is a perspective view of a pivot mechanism for the head saw.

A head saw support 116 (FIG. 11) is mounted to cart 46 and supports head saw 40 on cart 46. Head saw support 116 includes an attachment bar 118 and pivot plate 120 which each have mutually aligned top surfaces 122. Head saw 40 rests on, and is partially supported by, top surfaces 122 of attachment bar 118 and pivot plate 120. Pivot plate 120 is rotatable about a horizontal axis 124 (see arrow E in FIG. 11). The rotation of pivot plate 120 varies the angle of head saw 40 that corresponds to angle "c." The rotation of pivot plate 120 is controlled by the rotation of a shaft 126. Shaft 126 includes handle 100 which facilitates its rotation. Shaft 126 extends through slot 98 in limit bar 94 adjacent handle 100 (FIG. 1). Shaft 126 includes an externally threaded end opposite handle 100. These external threads engage internal threads on a disk 128. The rotation of shaft 126 causes disk 128 to move generally longitudinally along shaft 126 either toward or away from handle 100, depending on the direction of rotation of shaft 126. Disk 128 is attached to a pair of upper and lower arms 130 and 132, respectively. Lower arm 132 is pivotably attached at a pivot axis 134 to a base block 136. Base block 136 is mounted on a base 138 which, in turn, is attached to cart 46. Upper arm 130 is pivotably attached to pivot plate 120 at a pivot axis 140 defined in a connector 142. The movement of disk 128 toward handle 100 causes upper and lower arms 130 and 132 to be pivoted into a more vertical orientation. This movement forces connector 142 upwards, thereby causing pivot plate 120 to pivot or rotate in a counterclockwise direction (as seen in FIG. 11) about pivot axis 124. By rotating shaft 126 in a manner that causes disk 128 to move away from handle 100, upper and lower arms 130 and 132 are moved toward a more horizontal orientation. This movement forces pivot plate 120 to pivot about pivot axis 124 in a generally clockwise direction (as seen in FIG. 11).

The pivoting of pivot plate 120 causes head saw 40, which is attached on top of pivot plate 120 and attachment bar 118, to pivot. In order to cut a full dove-tail notch 22, it is necessary to be able to pivot head saw 40 to angle "c," make a first head cut 28, pivot head saw 40 to an angle equal to the difference between angle "c" and 180 degrees, and then make a second head cut 28. While angle "c" could be set at one of an infinite variety of settings by rotating handle 100 to a desired amount, angle "c" and its 180 degree complement are preferably set to be at the extreme limits of the pivoting of pivot plate 120. In this manner, an operator can simply pivot plate 120 to its maximum extent in one direction to cut a first head cut 28. Thereafter, pivot plate 120 is pivoted to its maximum extent in the opposite direction to allow the second head cut 28 to be made. No angular measurement need be made by the operator in this method, yet the two head cuts 28 in a full dove-tail notch 22 will be symmetrical with respect to each other.

The pivoting of plate 120 is stopped from pivoting in one direction by an adjustable bolt 144 inserted through base 138 (FIG. 11). Bolt 144 is externally threaded and engages internal threads on base 138 such that rotation of bolt 144 will cause it to move up or down on base 138, depending on its direction of rotation. The height of the bolt head with respect to base 138 can therefore be varied. Bolt 138 is positioned on base 138 such that one or both of lower arms 132 will eventually contact the head of bolt 138 when pivot plate 120 is rotated about axis 124 in a clockwise direction (as seen in FIG. 11). Bolt 138 will thereby limit the pivoting of plate 120 in a clockwise direction. This pivoting limit can be adjusted by rotating bolt 138 further into, or further out of, base 138. The height of bolt 138 is preferably set, as noted above, to stop pivot plate 120 at an angle equal to either angle "c" or its 180 degree complement.

The pivoting of plate 120 in a counterclockwise direction, as seen in FIG. 11, is stopped by an edge 146 defined on one or both of lower arms 132. As shaft 126 is rotated in a manner to cause disk 128 to move toward handle 100, upper and lower arms 130 and 132 will be rotated toward a more vertical orientation. The movement will be stopped when a side of upper arm 130 abuts against edge 146. As discussed above, edge 146 is preferably, although not necessarily, configured to stop plate 120 at an angle equal to either angle "c" or its 180 degree complement.

Figure 3:
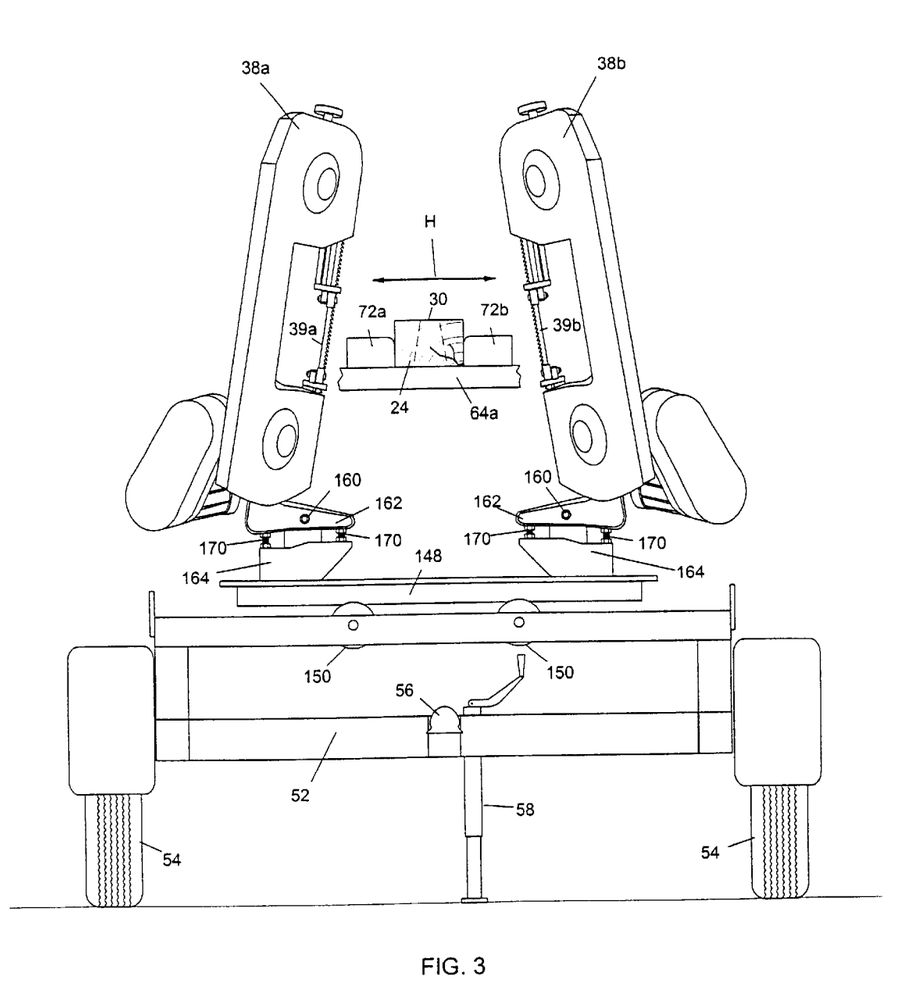
FIG. 3 is a partial, front, elevational view of the back saws on the apparatus of FIG. 1, shown with various components removed for clarity.
Figure 16:
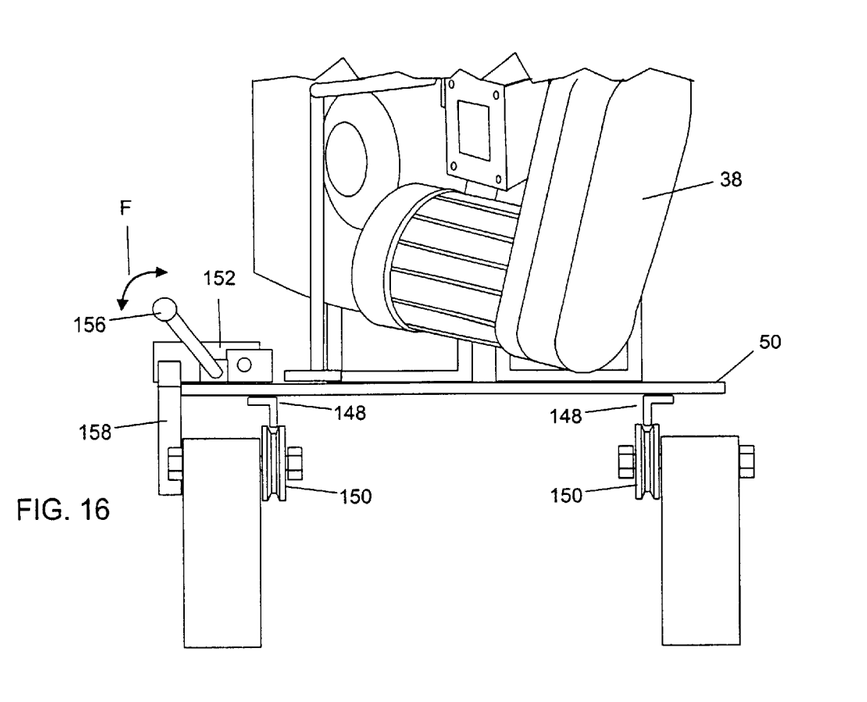
FIG. 16 is a side, elevational view of a movable platform to which the back saw is mounted.
Figure 17:
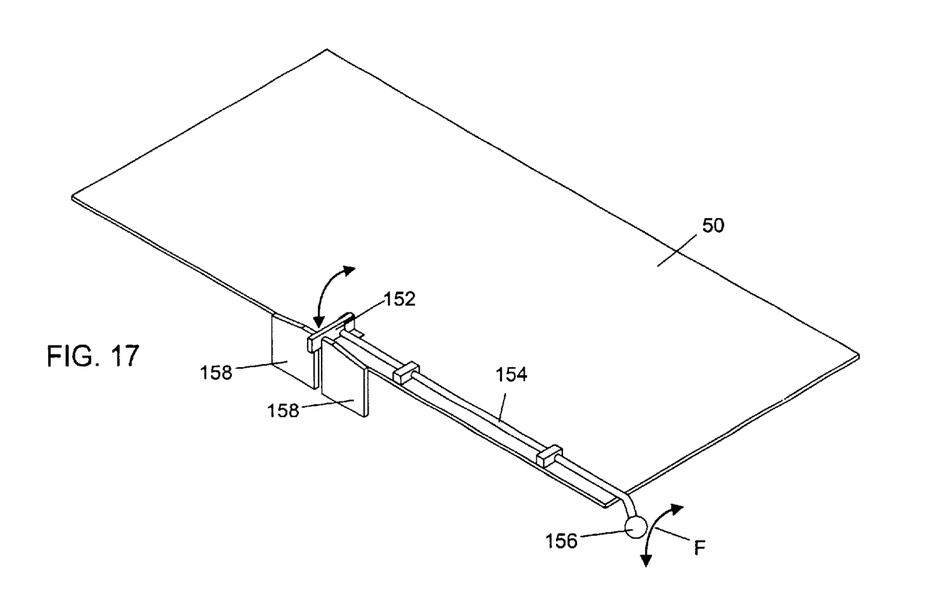
FIG. 17 is a top, perspective view of the movable platform of FIG. 16.

Back saws 38 are mounted on movable platform 50 which is movable in a direction generally transverse to the longitudinal extent of board 24 when it is positioned on support 42. The direction of this movement is illustrated by arrow H in FIG. 3. Platform 50 includes a pair of parallel tracks 148 affixed to its underside that ride in grooves defined on four wheels 150 (FIGS. 3 & 16). Wheels 150 rollingly support platform 50 and allow it to be moved transversely to the length of board 24. Platform 50 is selectively prevented from rolling on wheels 150 by way of a pivotable stop 152 attached to a top side of platform 50 (FIGS. 16–17). Pivotable stop 152 is generally attached to the top side of platform 50 along a rear, center part of platform 50. A shaft 152 is attached to pivotable stop 150 and extends to one side of platform 50 where it connects to a handle 156. Rotation of handle 156 by an operator in the direction indicated by arrows F in FIGS. 16–17 causes stop 150 to pivot in a direction indicated by arrow G in FIG. 17. In the position illustrated in FIG. 17, stop 150 prevents platform 50 from moving by contacting either of two immobile stop plates 158 attached to the frame of trailer 52. When stop 150 is pivoted out of the position illustrated in FIG. 17, stop 150 no longer contacts either of stop plates 158 when platform 50 is moved, thereby allowing platform 50 to move freely. Stop 150 thus selectively locks platform 50 in a centered, non-mobile position.

The movement of platform 50 allows back saws 38 to be pushed into board 24 to make back cuts 26. In the illustrated embodiment, the position of wheels 150 cannot be adjusted. Platform 50 therefore can only move in a direction transverse to board 24, and angle "a" of back cut 26 cannot be varied, but rather is fixed at approximately 90 degrees. It will be understood that simple modifications to the illustrated embodiment could be made by one skilled in the art to allow back saws 38 to be adjustable in order to vary angle "a" in dove-tail notch 22.

Figure 18:
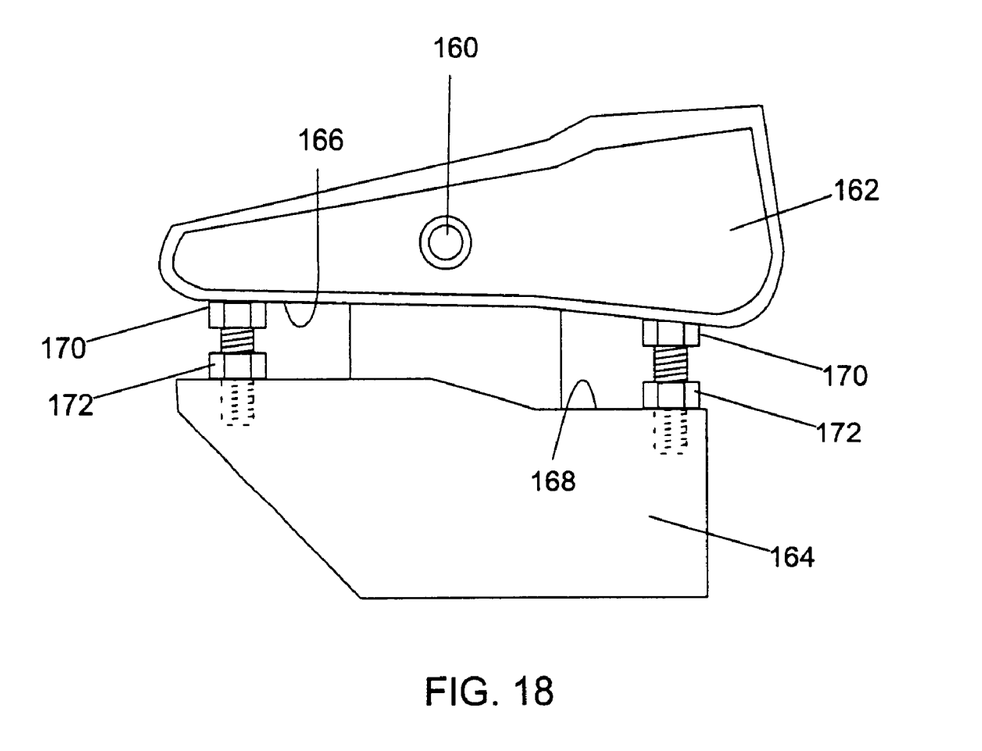
FIG. 18 is a partial, elevational view of a pivotable saw support.

Each of back saws 38 are pivotable about a horizontal axis 160 oriented generally parallel to the longitudinal extent of board 24 when it rests on support 42 (FIGS. 3 & 18). Each saw 38 includes a foot 162 attached at its bottom. Horizontal axis 160 is defined generally through the center of foot 162. A saw base 164 is stationarily mounted to platform 50 and supports saw foot 162 on horizontal axis 160. Each saw foot 162 includes a bottom surface 166 spaced away from and above a top surface 168 on each base 164. A pair of adjustment bolts 170 are positioned between top surface 168 of base 164 and bottom surface 166 of saw foot 162. Adjustment bolts 170 are externally threaded and fit into internally threaded holes defined in base 164. By rotating adjustment bolts 170, the height of the head of the adjustment bolt 170 above top surface 168 of base 164 can be varied. Because back saws 38 are pivotally mounted on bases 164, changes in the height of adjustment bolts 170 will cause saw feet 162 to rotate about horizontal axis 160. The rotation of saw feet 162 causes backs saws 38 to also rotate or pivot. After each adjustment bolt 170 has been rotated to its desired height, it can be secured in that position by way of a locking nut 172. Locking nut 172 is internally threaded and locks bolt 170 in a desired rotation by being rotated until it tightly abuts against top surface 168 of base 164. Locking nut 172 helps ensure that bolts 170 remain in their desired position despite any vibrations that may occur during the sawing process that might otherwise cause them to rotate and consequently change their height.

Adjustment bolts 170 are set such that blade 39 of one of back saws 38 will have an angle "d" measured from a vertical axis (FIG. 7). Angle "d" will have a magnitude that is equal to the ninety degree complement of angle "c" (i.e. 90° −angle "c"). The other of back saws 38 is adjusted via adjustment bolts 170 such that it will also be slanted at an angle having a magnitude equal to angle "d." While the magnitude of the angle of this second back saw 38 will be the same as that of angle "d," it will be oriented in an opposite direction such that the blades 39 of each back saw 38 will have their upper ends angled towards each other. The angling of back saws 38 ensures that back cuts 26 will terminate at an angle that matches angle "c" of head cuts 28. When an operator of cutting apparatus 20 cuts back cuts 26, either the desired depth of back cuts 26 should be marked on board 24 or head cuts 28 should be made prior to cutting back cuts 26. In the former situation, the markings indicate to the operator where he or she should stop cutting, while in the latter case the head cut surface 28 provides the visual indication as to when to stop cutting back cuts 26.

Figure 12:
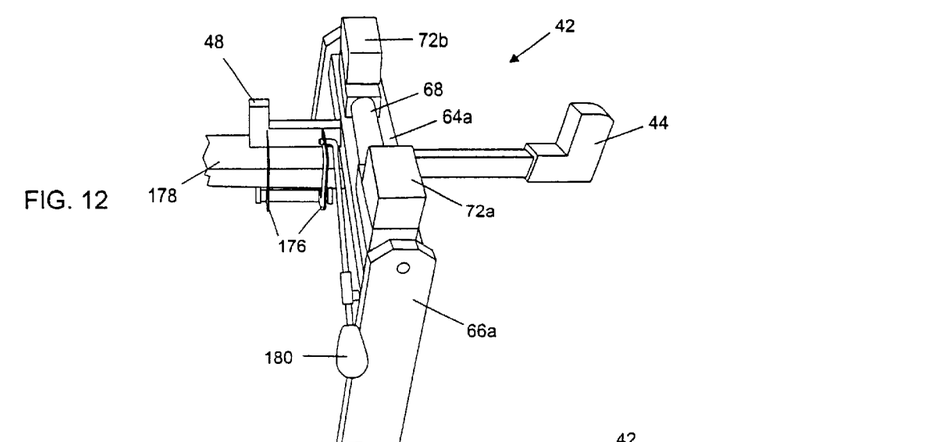
FIG. 12 is a side perspective view of a pair of lumber stops on the apparatus of FIG. 1.

If head cuts 28 are made prior to making back cuts 26, board 24 should be repositioned on support 42 prior to making back cuts 26. When head cuts 28 are to be made, the front end of board 24 is pushed up against front stop 44. When back cuts 28 are to be made, the front end of board 24 should be pushed up against adjustable rear stop 48. FIGS. 12 & 13 illustrate rear stop 48 in the stopping position used when back cuts 28 are to be made. FIG. 14 illustrates rear stop 48 pivoted to a non-stopping position used when board 24 is pushed up against front stop 24 during the cutting of head cuts 28. Rear stop 48 is attached to a pair of arms 176 that are pivotally attached to an underside of a beam 178. A handle 180 is attached to one or both of arms 176 and is used to move rear stop 48 between the stopping and non-stopping position.

Head saw 40 also includes a foot 162 and base 164, such as those described above with respect to back saws 38. Head saw 40 is pivotable on base 164 about a pivot axis 182 (FIG. 1). The pivoting is controlled via adjustment bolts in the same manner used to control the pivoting of back saws 38 about pivot axes 160. It is not necessary to pivot head saw 40 about pivot axis 182 prior to cutting other than to ensure that saw blade 41 of head saw 40 has its teeth in a plane that is perpendicular to the longitudinal extent of board 24. This ensures that head cut 28 will evenly meet the adjacent back cut 26.

A variety of different modifications can be made to the embodiment of the present invention described above without departing from the spirit of the invention. As one example, a second head saw 40 could be added. The second head saw could be used to cut the second head cut 28 while the first head saw would be used to cut the first head cut of a full dove-tail notch. This would eliminate the need for making any adjustments to either of the head saws when making the head cuts 28. There would therefore be no need for pivotable platform 102. As another example, it would be possible to remove one of back saws 38. In such a situation, the cutting of a full dove-tail notch 22 would be carried out by first cutting one head cut 28 and one back cut 26 into the board 24. The board 24 would then be turned upside-down so that the uncut side faced the back saw 38. Back saw 38 would then be adjusted via adjustment bolts 170 and a second back cut 26 would be made by back saw 38. Head saw 40 would be adjusted via pivotable head saw support 116 prior to making the second head cut.

What is claimed is:

1. A lumber cutting assembly comprising:
    a longitudinally extending, generally horizontal support adapted to support a piece of lumber to be cut, said support having first and second sides opposite each other, and a front and back end opposite each other;
    a first saw positioned on the first side of said support, said first saw movable toward and away from said support;

a second saw positioned on the second side of said support, said second saw movable toward and away from said support;

a third saw positioned adjacent the front end of said support, said third saw movable longitudinally toward and away from the front end of said support; and a pivot to which said third saw is attached, said pivot adapted to allow said third saw to pivot about a vertical axis such that said third saw can be pivoted between said first and second sides of said support.

2. The assembly of claim 1 wherein said third saw is pivotable about a first horizontal axis.

3. The assembly of claim 1 wherein said third saw is pivotable about a first and second horizontal axes, said first and second horizontal axes being generally perpendicular to each other.

4. The assembly of claim 1 wherein said fast and second saws are positioned on a generally horizontal platform which is movable in a direction perpendicular to the longitudinal extent of said support.

5. The assembly of claim 1 wherein said first, second, and third saws are mounted on a trailer having at least one wheel and a hitch adapted to allow the trailer to be pulled by a car or truck.

6. The assembly of claim 1 further including a generator adapted to burn fuel to generate electricity, said generator providing electric power to said first, second, and third saws.

7. The assembly of claim 1 wherein said first, second, and third saws are band saws.

8. The assembly of claim 1 further including a first and second stop, said first stop positioned to stop the front end of the piece of lumber adjacent said first and second saws, said second stop positioned to stop the front end of the piece of lumber adjacent said third saw.

9. The assembly of claim 1 further including a cart on which said third saw is positioned, said cart rollingly positioned on a pivotable track.

10. The assembly of claim 9 wherein said first, second, and third saws are mounted on a trailer having at least one wheel and a hitch adapted to allow the trailer to be pulled by a car or truck.

11. A lumber cutting assembly comprising:

a longitudinally extending generally horizontal support adapted to support a piece of lumber to be cut, said support having first and second sides oppose each other, and a front and back end opposite each other;

a first saw positioned on the fit side of said support, said first saw movable toward and away from said support;

a second saw positioned on the second side of said support, said second saw movable toward and away from said support;

a third saw positioned adjacent the front end of said support, said third saw movable longitudinally toward and away from the front end of said support; and said third saw being pivotable about both a first horizontal axis and a second horizontal axis, said second horizontal axis being generally perpendicular to said first horizontal axis.

12. A lumber cutting assembly comprising:

a longitudinally extending, generally horizontal support adapted to support a piece of lumber to be cut, said support having first and second sides opposite each other, and a front and back end opposite each other;

a first saw positioned on the first side of said support, said first saw movable toward and away from said support;

a second saw positioned on the second side of said support, said second saw movable toward and away from said support;

said first and second saws each being pivotable about a horizontal axis toward and away from said support; and a third saw positioned adjacent the front end of said support, said third saw movable longitudinally toward and away from the front end of said support.

13. A lumber cutting assembly comprising:

a longitudinally extending, generally horizontal support adapted to support a piece of lumber to be cut, said support having first and second sides opposite each other, and a front and back end opposite each other;

a first saw positioned on the first side of said support, said first saw movable toward and away from said support;

a second saw positioned on the second side of said support, said second saw movable toward and away from said support;

said first and second saws each being pivotable about a horizontal axis toward and away from said support; and a third saw positioned adjacent the front end of said support, said third saw movable longitudinally toward and away from the front end of said support.

14. An apparatus for cutting dove-tail notches in a piece of lumber having a top surface, a first side surface, and a second side surface, said apparatus comprising:

a trailer adapted to be towed by a car or truck;

a support for supporting the piece of lumber while being cut, said support being positioned on said trailer;

at least one saw on said trailer for cutting at least one back cut in the piece of lumber, said back cut being generally perpendicular to said top surface, said back cut shortening the length of one of said side surfaces of said piece of lumber;

at least one saw on said trailer for cutting at least one head cut in the piece of lumber, said head cut defining a plane that is not perpendicular to a plane defined by said top surface and that is not perpendicular to a plane defined by said back cut, said saw for cutting at least one head cut being movable toward and away from the piece of lumber; and a cart on which said saw for cutting at least one head cut is positioned, said cart being pivotally supported on said trailer for pivoting about a generally vertical axis, whereby said saw for cutting at least one head cut can be pivoted from said first side surface to said second side surface of the piece of lumber.

15. An apparatus for cutting dove-tail notches in a piece of lumber having a top surface, a first side surface, and a second side surface, said apparatus comprising:

at least one band saw for cutting at least one back cut in the piece of lumber, said back cut being generally perpendicular to said top surface, said back cut shortening the length of one of said side surfaces of the piece of lumber;

at least one band saw for cutting at least one head cut in the piece of lumber, said head cut defining a plane that is not perpendicular to a plane defined by said back cut and that is not perpendicular to a plane defined by said top surface, said saw for cutting at least one head cut being movable toward and away from the piece of lumber; and a cart on which said saw for cutting at least one head cut is positioned, said cart being pivotable about a generally vertical axis whereby said saw for cutting at least one head cut can be pivoted from said first side surface to said second side surface of the piece of lumber.

* * * * *

UNITED STATES PATENT AND TRADEMARK OFFICE
CERTIFICATE OF CORRECTION

PATENT NO. : 6,688,197 B1
DATED : February 10, 2004
INVENTOR(S) : Niemela

It is certified that error appears in the above-identified patent and that said Letters Patent is hereby corrected as shown below:

Column 6,
Line 52, "10a" should be -- 110a --

Column 11,
Line 17, "fast" should be -- first --
Line 45, "oppose" should be -- opposite --
Line 47, "fit" should be -- first --

Signed and Sealed this

Fourth Day of January, 2005

JON W. DUDAS
*Director of the United States Patent and Trademark Office*